United States Patent [19]
Kirn et al.

[11] Patent Number: 5,352,948
[45] Date of Patent: Oct. 4, 1994

[54] ARMATURE FOR HIGH-SPEED ELECTRIC MOTORS FORCE-VENTILATED IN AIR CONTAINING ABRASIVE DUST

[75] Inventors: Manfred Kirn; Werner Grammer, both of Stuttgart; Gerhard Kraemer; Meinhard Eule, both of Aichtal-Neuenhaus, all of Fed. Rep. of Germany

[73] Assignee: Robert Bosch GmbH, Stuttgart, Fed. Rep. of Germany

[21] Appl. No.: 966,164

[22] PCT Filed: May 28, 1991

[86] PCT No.: PCT/DE91/00456
§ 371 Date: Jan. 11, 1993
§ 102(e) Date: Jan. 11, 1993

[87] PCT Pub. No.: WO92/00626
PCT Pub. Date: Jan. 9, 1992

[30] Foreign Application Priority Data
Jun. 23, 1990 [DE] Fed. Rep. of Germany ....... 9007029

[51] Int. Cl.⁵ ............................................. H02K 3/48
[52] U.S. Cl. ........................................ 310/214; 310/42; 310/45; 310/198; 310/208; 310/261; 310/270; 310/271
[58] Field of Search ............... 310/214, 261, 270, 271, 310/262, 215, 208, 195, 198, 42, 43, 45, 88, 194

[56] References Cited
U.S. PATENT DOCUMENTS

| 2,078,024 | 4/1937 | Roth . | |
|---|---|---|---|
| 2,232,812 | 2/1941 | Studer | 310/270 UX |
| 2,465,820 | 3/1949 | Sharrow et al. . | |
| 2,896,100 | 7/1959 | Axelson | 310/271 UX |
| 3,509,621 | 5/1970 | Honsinger | 310/271 UX |

FOREIGN PATENT DOCUMENTS

| 1538908 | 2/1971 | Fed. Rep. of Germany . | |
| 1763508 | 12/1971 | Fed. Rep. of Germany . | |
| 3842074 | 6/1990 | Fed. Rep. of Germany | 310/270 |
| 2432792 | 2/1980 | France . | |
| 190521 | 12/1922 | United Kingdom . | |
| 994369 | 6/1965 | United Kingdom . | |

*Primary Examiner*—R. Skudy
*Attorney, Agent, or Firm*—Michael J. Striker

[57] ABSTRACT

The armature (1) for high-speed electric motors force-ventilated in air containing abrasive dust, in particular in electric tools including right angle grinders, has windings which are laid in slots (7) of an armature laminate stack (5), and are held down in the slots (7) by elongated, elastic slot seals (15), and forth winding overhangs (9, 11) on the end faces of the armature. To increase the strength of the armature winding, the resistance to cooling air containing abrasive dust, and to improve the cooling, the slot seals (15) project over the slots (7), follow the contour of the winding overhangs (9, 11), in particular along surface lines, in the armature longitudinal direction, extend up to the end faces of the armature (1), and their ends are secured there by a ring (19) or cord winding (17).

10 Claims, 3 Drawing Sheets

ARMATURE FOR HIGH-SPEED ELECTRIC MOTORS FORCE-VENTILATED IN AIR CONTAINING ABRASIVE DUST

BACKGROUND OF THE INVENTION

The invention relates to an armature having windings laid in slots of an armature laminate stack, which are held down in the slots by elongated, elastic slot seals and form winding overhangs on the end faces of the armature.

An armature of the general type as that of the invention is disclosed in DE-AS 1,538,908. Although in this armature, the winding transition region between a winding overhang and a commutator is relatively securely fixed and protected against centrifugal forces, the winding overhangs or the windings situated in the slots of the armature laminate stack are not protected by separate means. Armatures configured in this way do not withstand the loads to which modern electric tools are exposed, since excessive demands are made on them by jarring blows and vibrations such as occur, for example, with hammer drills or right angle grinders. In addition, there is the high loading, usual with such machines, due to environmental air, which contains abrasive dust and is used for forced cooling, owing to which the winding overhangs are abraded, with the result that the armature is destroyed.

SUMMARY OF THE INVENTION

It is an object of the present invention to provide an improved armature of the above-described type which does not have the above-described disadvantages.

These objects and others which will be made more apparent hereinafter are attained in an armature for a high-speed electric motor having windings laid in slots of an armature laminate stack, which are held down in the slots by elongated, elastic slot seals and form winding overhangs on the end faces of the armature.

According to the present invention, at least one of the slot seals follows a contour of the winding overhangs in an armature longitudinal direction, especially along the surface, and extends up to the end faces of the armature and is secured or held on the armature there by a cord winding or ring.

The armature according to the invention have the advantage that reinforcement consisting of the slot seals hitherto customary in any case can be produced in a particularly sample way. This reinforcement can absorb the strong mechanical vibrations which loosen or rupture the winding, such as occur, for example, given use in hammer drills or right angle grinders. However, it also protects the winding overhangs both against abrasion by cooling air which contains abrasive dust and against the action of centrifugal forces when the armature is rotating at maximum speeds, and additionally improves the cooling of the electric motor due to the ventilator effect of the rib-like bulges on the winding overhangs.

Advantageously the cord windings extend circumferentially around the armature and can be formed by one or more of the slot seals themselves.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
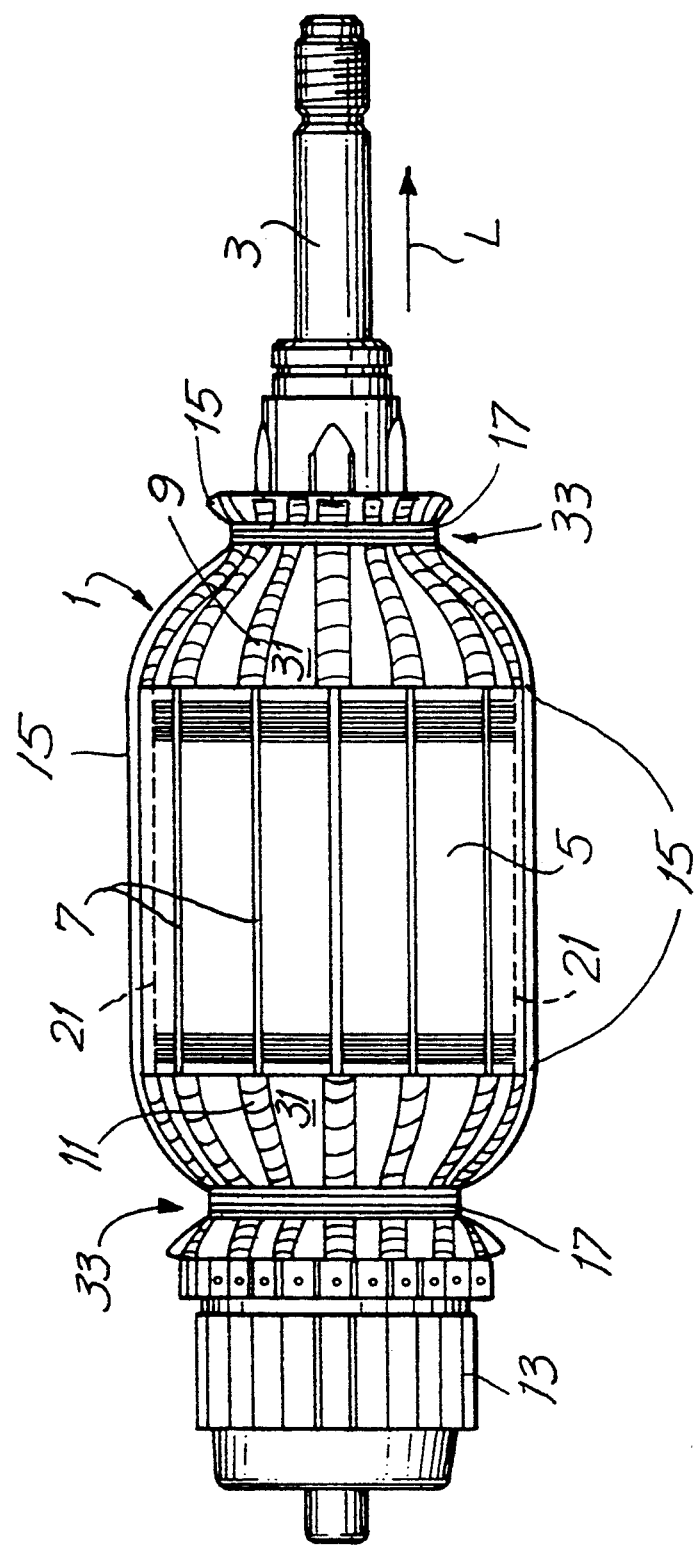
FIG. 1 is a side elevational view of one embodiment of the armature for a high-speed electric motor according to the invention.

An exemplary embodiment of an armature 1 shown in the drawing consists of an armature shaft 3 which supports an armature laminate stack 5 having slots 7. Guided through the slots 7 are windings 21 which consist of an electrical conductor winding overhangs 9, 11 on the armature end faces are extended in an armature longitudinal direction L to form and are connected with their ends to a collector 13.

The slots 7 are filled with slot seals 15 treated with impregnating resin. In the drawing only the uppermost and lowermost slot seals 15 are shown covering the slots 7 and the windings 21 held in them for simplicity of illustration. The remaining slots 7 are shown without the slot seals. The slot seals 15 each consist of paper cord or textile fabric cord which is about 3 mm thick, and is pressed into the its slot 7, so that the winding is held firmly on the slot bottom and is not able to move out of the slots 7, even when large centrifugal forces are present. The ends of the slot seals 15 are held on the waist 33 of the winding overhangs 9, 11 by a cord winding 17, and thus form a rib-like reinforcement of the armature end faces or the winding overhangs 9, 11.

Figure 2:
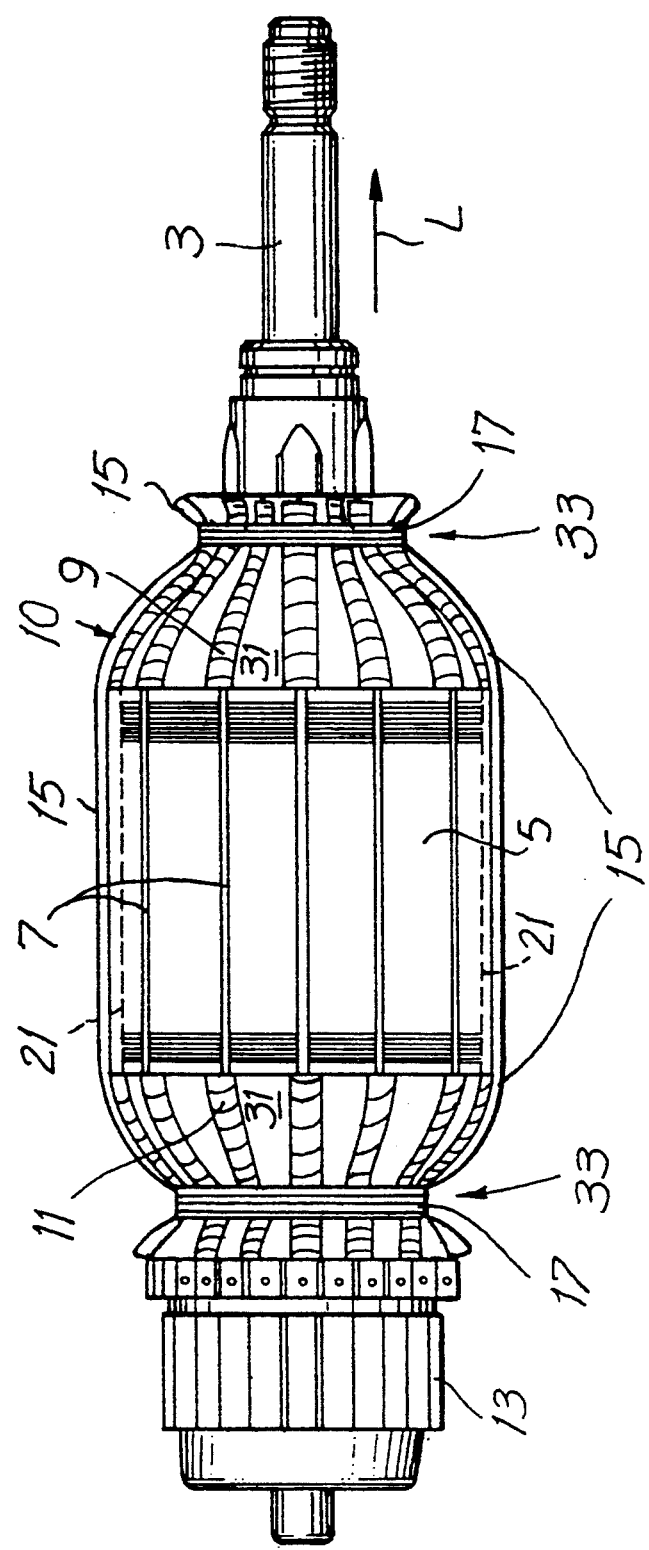
FIG. 2 is a side elevational view of another embodiment of the armature according to the invention.

In another embodiment of the armature 10 shown in FIG. 2 the cord winding is formed by one or more slot seals 15 of excessive length, whose excess length is wound once or several times around the waists of the winding overhangs 9, 11 over the ends of the slot seals and fixed, for example by knots or bonding.

Figure 3:
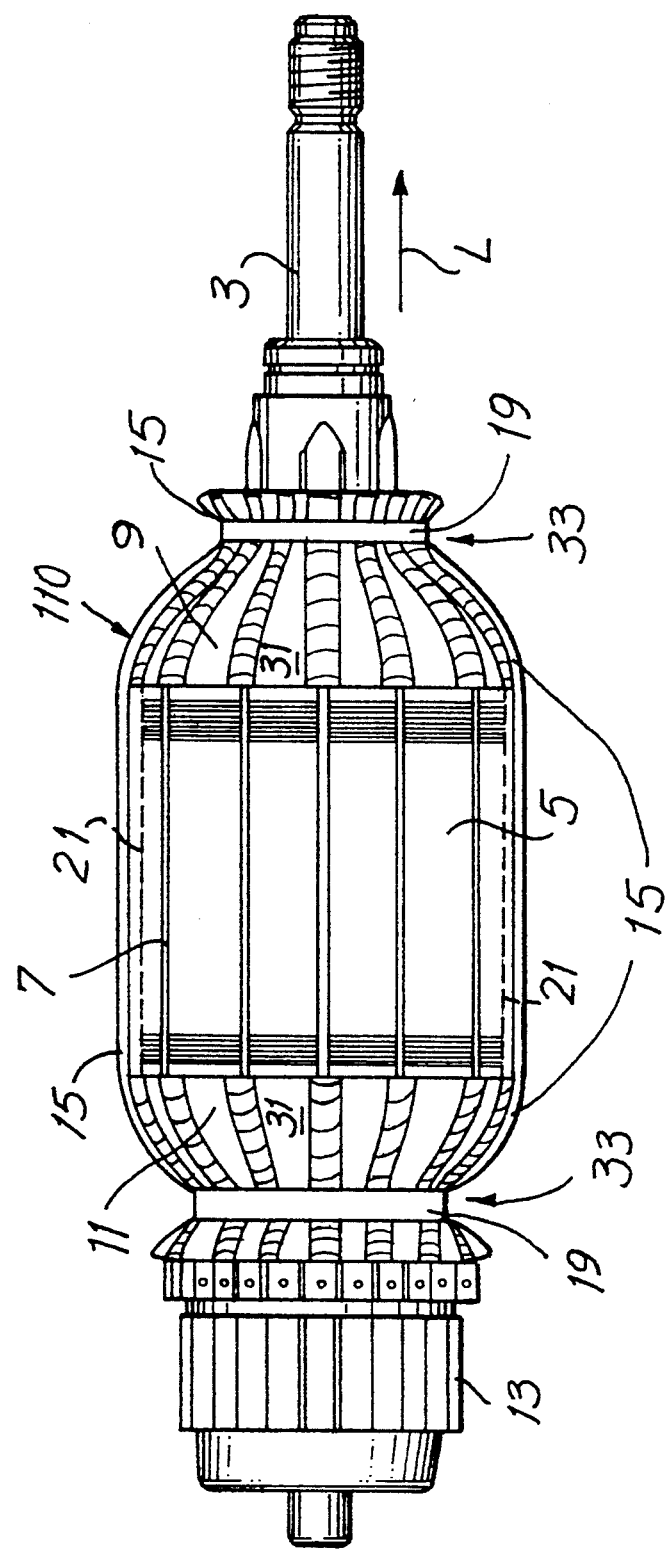
FIG. 3 is a side elevational view of an additional embodiment of the armature according to the invention.

In an additional embodiment of the armature 110 shown in FIG. 3, it is possible instead of the cord windings to arrange rings 19, for example rubber rings, which are firmly seated on the ends of the slot seals and the smallest diameters of the winding overhangs 9, 11 due to appropriate elasticity and pretensioning or to deformation.

Another advantageous exemplary embodiment is obtained when the slot seals consist of plastic material which can still be deformed for a limited time after being mounted on the armature, and can be adapted in accordance with the contours of the winding overhangs, or can be altered for the purpose of a possible improvement in flow, for example in order to increase the ventilator effect.

The slot seals 15 are wetted with impregnating resin in all the embodiments, with the result that there is a particularly firm connection between the slot seals and the winding overhangs.

While the invention has been illustrated and described as embodied in an armature for a high-speed electric motor, it is not intended to be limited to the details, shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Armature for a high-speed electric motor force-ventilated in air containing abrasive dust, said armature having end faces and an armature longitudinal direction and comprising:

an armature shaft;

an armature laminate stack on the armature shaft, said armature laminate stack being provided with a plurality of slots;

windings laid in said slots of said armature laminate sack and extended in said armature longitudinal direction to form winding overhangs on both of the end faces of the armature, each of said winding overhangs having a waist corresponding to a smallest diameter of said winding overhangs;

a plurality of elongated, elastic slot seals holding said windings in said slots, connected to said winding overhangs and extending on said winding overhangs to said waists; and means for securing said slot seals on the end faces of said armature.

2. Armature as defined in claim 1, wherein said means for securing comprises a ring extending circumferentially around said winding overhangs.

3. Armature as defined in claim 1, wherein said means for securing comprises a cord winding extending circumferentially around said waist of said winding overhangs.

4. Armature as defined in claim 3, wherein said cord winding is formed by at least one of said slot seals.

5. Armature as defined in claim 2, wherein said ring is fixed with an impregnated resin.

6. Armature as defined in claim 3, wherein said cord winding is fixed with an impregnated resin.

7. Armature as defined in claim 1, wherein said slot seals are strip-like elements inserted into said slots.

8. Armature as defined in claim 1, wherein said slot seals are cord-like elements inserted into said slots.

9. Armature as defined in claim 1, wherein said slot seals consist of knitted fibers.

10. Armature as defined in claim 1, wherein said slot seals are plastically deformable.

* * * * *